April 28, 1925. 1,535,108
S. T. DAHL
CARBON ELECTRODE FOR VACUUM LIGHTNING CONDUCTORS
Filed Feb. 28, 1923
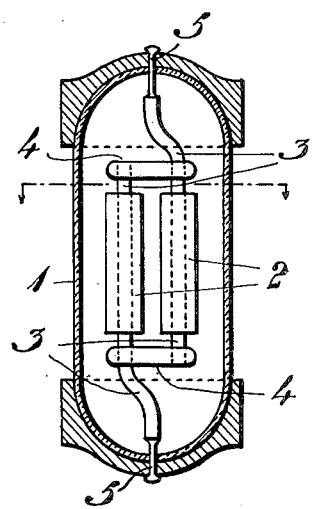
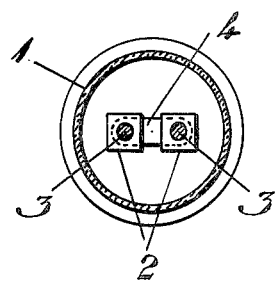
INVENTOR:
Sten Jage Dahl
BY Wm Wallace White
ATTY.

Patented Apr. 28, 1925.

1,535,108

UNITED STATES PATENT OFFICE.

STEN TAGE DAHL, OF STOCKHOLM, SWEDEN, ASSIGNOR TO OLOF KULLBERG-MAYER, OF KATRINEHOLM, SWEDEN.

CARBON ELECTRODE FOR VACUUM LIGHTNING CONDUCTORS.

Application filed February 28, 1923. Serial No. 621,875.

*To all whom it may concern:*

Be it known that I, STEN TAGE DAHL, a subject of the King of Sweden, residing at Stockholm, Sweden, have invented new and useful Improvements in Carbon Electrodes for Vacuum Lightning Conductors, of which the following is a specification.

In the case of lightning conductors electrodes of both metal and carbon have previously been in use. Carbon electrodes possess certain advantages over metal electrodes in these apparatus, but are difficult to mount at a mutual or relative distance in the apparatus. The present invention refers to a device in the case of carbon electrodes for vacuum lightning conductors, by which this drawback is removed by the carbon electrodes being provided with metal conductors passing entirely through the same, whose parts projecting from the carbon electrodes are attached to insulating bridges, for example, of glass. In the carbon electrode system thus formed by the carbon electrodes themselves, the metallic conductors and the insulating bridges, the carbon electrodes themselves are securely kept at their determined relative or mutual distance and are not disturbed from this either during or after their mounting in the glass casing. In contradistinction to previously suggested vacuum lightning conductors with carbon electrodes in the shape of discs or slabs surrounded by metal conductors running in grooves of the same, the present invention, besides the aforesaid advantage, possesses also the advantage that the metal conductors are suitable for attaching at two opposite ends of the vacuum glass-casing, which contributes towards steadying the electrodes in the same.

On the accompanying drawing is shown only by way of an example in Fig. 1 in vertical section and in Fig. 2 in horizontal section a vacuum lightning conductor with a device according to the present invention. 1 is an evacuated glass casing. In this there are two carbon electrodes 2 with metal conductors 3 passing axially through them. These latter are fixed in glass bridges 4. One of the metal conductors 3 continues up through the upper glass bridge, and the other down through the lower glass bridge, each one to its platinum wire 5, which passes through the glass casing upwards or downwards, as the case may be. One of these platinum wires connected with its respective metal conductor 3, is earthed and the other connected with that lead or line which has to be protected. It is of advantage to have the metal conductors at a proper point deformed in such a manner that the deformation is in the body of the carbon electrodes and prevents the latter from turning or twisting upon the metal conductors. Such a device is remarkably simple and efficient for the purpose. In order to better understand this device we can state an example. Let us suppose that the metal conductors are circular in transverse section, that the carbon electrodes are equipped with correspondingly shaped holes pierced entirely through them, and that the carbon electrodes are strung or pushed upon the metal conductors. If a suitable deformation has been made upon the metal conductors, for example, a slight bend or flattening out causing an enlargement in the transverse section of the metal conductors at this point in one direction simultaneously with a compression in another direction, this deformation on stringing or putting on will wedge itself fast in the holes on the carbon electrodes and thus prevent the carbon electrodes from turning or twisting on the metal conductors. Of course, the carbon electrodes can be fixed on the metal conductors in another way than by being strung on, provided only the metal conductors pass entirely through the carbon electrodes, which latter is not the case in the aforementioned, previously suggested vacuum lightning conductor.

The separate parts of the vacuum lightning conductor shown can be varied as to material, size, shape, number, composition and attachment and also reversed, provided only the characteristics of the invention be retained. Among other things, it may be mentioned that more than two carbon electrodes may be used. If, e. g. three carbon electrodes are being used, one will be fixed between the other two. The third metal conductor which passes entirely through is likewise fixed to the metal bridges and connected by means of one end with a platinum wire passing through the side of the glass casing and earthed.

What I claim is:

1. A lightning arrester, comprising, in combination, a plurality of carbon electrodes disposed in parallel spaced relation to each other, an insulating bridge adjacent to each end of the electrodes, and a metal conductor passing through each electrode from one end to the other, both ends of the conductor emerging from the electrode and secured to the respective bridges.

2. A lightning arrester, comprising, in combination, a plurality of carbon electrode disposed in spaced parallel relation to each other, an insulating bridge adjacent to each end of the electrodes, and a metal conductor passing through each electrode from one end to the other, both ends of each conductor emerging from the electrode and secured to the respective bridges, said conductors being deformed within the electrodes to prevent displacement of the electrodes relative to the conductors.

In testimony whereof I have signed my name to this specification.

STEN TAGE DAHL.